(12) United States Patent
Rajagopalan

(10) Patent No.: US 6,989,422 B2
(45) Date of Patent: Jan. 24, 2006

(54) MONODISPERSE TELECHELIC DIOL-BASED POLYURETHANES FOR USE IN GOLF BALLS

(75) Inventor: Murali Rajagopalan, South Dartmouth, MA (US)

(73) Assignee: Acushnet Company, Fairhaven, MA (US)

( * ) Notice: Subject to any disclaimer, the term of this patent is extended or adjusted under 35 U.S.C. 154(b) by 123 days.

(21) Appl. No.: 10/656,704

(22) Filed: Sep. 5, 2003

(65) Prior Publication Data

US 2005/0054782 A1    Mar. 10, 2005

(51) Int. Cl.
*A63B 37/12*    (2006.01)

(52) U.S. Cl. .................... 525/131; 528/61; 528/64; 528/65; 528/85; 473/374; 473/378

(58) Field of Classification Search ............... 525/131; 528/61, 64, 65, 85; 473/374, 378
See application file for complete search history.

(56) References Cited

U.S. PATENT DOCUMENTS

| | | | |
|---|---|---|---|
| 5,962,619 A * | 10/1999 | Seneker et al. ............... 528/64 |
| 5,965,681 A | 10/1999 | Schwindeman et al. .... 526/335 |
| 6,190,268 B1 * | 2/2001 | Dewanjee .................... 473/370 |
| 6,221,991 B1 | 4/2001 | Letchford et al. ........ 526/303.1 |
| 6,235,819 B1 | 5/2001 | Lawson et al. .............. 524/100 |
| 6,271,330 B1 | 8/2001 | Letchford et al. ............. 528/14 |
| 6,350,723 B1 | 2/2002 | Mishra et al. ............... 508/472 |
| 6,362,284 B1 | 3/2002 | Schwindeman et al. . 525/328.8 |
| 6,435,986 B1 | 8/2002 | Wu et al. .................... 473/378 |
| 2003/0114246 A1 * | 6/2003 | Yokota ........................ 473/351 |
| 2004/0077435 A1 * | 4/2004 | Matroni et al. .............. 473/378 |
| 2004/0225100 A1 * | 11/2004 | Rajagopalan et al. ......... 528/44 |
| 2004/0225102 A1 * | 11/2004 | Rajagopalan et al. ......... 528/61 |

* cited by examiner

Primary Examiner—David J. Buttner
(74) Attorney, Agent, or Firm—William B. Lacy

(57) ABSTRACT

A golf ball including a core and a cover layer including a curing agent and a polyurethane prepolymer formed from a polyisocyanate and a monodisperse telechelic polyol having a polydispersity of from about 1.0 to about 1.3, and having the formula:

$$T-Z_n-C-Y-C-Z_n-T$$

where Y is at least one molecule or mixtures of molecules having at least two independently polymerized vinyl groups, such as 1,3-divinylbenzene or 1,4-divinylbenzene; C is a hydrogenated or unsaturated block derived by anionic polymerization of at least one monomer selected from the group consisting of conjugated dienes, alkenyl-substituted aromatics, and mixtures thereof; $Z_n$ is a branched or straight chain hydrocarbon connecting group which contains n=1–50 carbon atoms; and T is hydroxyl.

24 Claims, No Drawings

MONODISPERSE TELECHELIC DIOL-BASED POLYURETHANES FOR USE IN GOLF BALLS

FIELD OF THE INVENTION

The invention relates to golf balls and, more particularly, to golf balls having cover(s), cores, and optional intermediate layers, that include monodisperse, hydrophobic, monodisperse telechelic polyurethanes elastomers.

BACKGROUND OF THE INVENTION

While golf ball construction can vary greatly, most golf balls can be classified as either solid or wound. Solid golf balls include one-piece, two-piece, and multi-layer constructions. Wound golf balls typically include a solid, hollow, or fluid-filled center, surrounded by tensioned elastomeric material and a cover. By altering ball construction and composition, manufacturers can vary a wide range of playing characteristics, such as resilience, durability, spin, and "feel," each of which can be optimized for various playing abilities.

By altering ball construction and composition, however, manufacturers can vary a wide range of characteristics, such as resilience, durability, spin, and "feel," each of which can be optimized for various player abilities. In particular, the golf ball components that many manufacturers continually look to improve are the core, intermediate layers, if present, and covers.

Generally, golf ball cores and/or centers are constructed with a polybutadiene-based polymer composition. The properties of the polybutadiene composition are controlled by adjusting the level of peroxides, curing agents, and fillers that are added.

Intermediate and, particularly, cover layers, while conventionally formed of ionomer-based materials, have, more recently, been formed of urethane-based materials, each having varying hardness and flexural moduli. Polyurethanes have become more preferred, especially for premium golf balls, because they have advantageous hardness and resilience properties compared to many ionomers. Conventional polyurethanes are typically formed from a prepolymer including a polyol and an isocyanate, and a curing agent. These polyurethanes, however, are still not ideal for golf ball layers—conventional monodisperse telechelic prepolymer polyols and polyamines typically have a polydispersity ($M_w/M_n$, where $M_w$ is the Weight Average Molecular Weight and $M_n$ is the Number Average Molecular Weight) of at least 2.0 which can cause decreased impact strength and resiliency.

There remains a need, therefore, for improved polyurethane compositions, especially those formed from unconventional starting materials, such as novel monodisperse (i.e., a polydispersity close to 1.0) telechelic polymers, as well as hydrogenated and/or unprotected analogues thereof. The monodisperse, hydrophobic monodisperse telechelic diols, and polyurethanes resulting therefrom, are suggested for use in a variety of golf ball constructions.

SUMMARY OF THE INVENTION

The present invention is directed to a golf ball including a core; and a cover layer including a curing agent and a polyurethane prepolymer formed from a polyisocyanate and a monodisperse telechelic polyol having a polydispersity of from about 1.0 to about 1.3, and having the formula:

$$T\text{-}Z_n\text{-}C\text{-}Y\text{-}C\text{-}Z_n\text{-}T$$

where Y is at least one molecule or mixtures of molecules having at least two independently polymerized vinyl groups, such as 1,3-divinylbenzene or 1,4-divinylbenzene; C is a hydrogenated or unsaturated block derived by anionic polymerization of at least one monomer selected from the group consisting of conjugated dienes, alkenyl-substituted aromatics, and mixtures thereof; $Z_n$ is a branched or straight chain hydrocarbon connecting group which contains n=1–50 carbon atoms; and T is hydroxyl. Ideally, C comprises hydrogenated isoprene having a peak molecular weight of from about 500 to about 350,000.

In one embodiment, the monodisperse telechelic polyol includes:

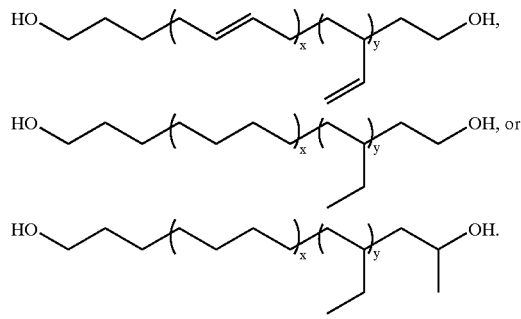

In a preferred embodiment, the core comprises a polybutadiene composition and the salt of a halogenated thiophenol and, more preferably, salt of a halogenated thiophenol includes the zinc salt of pentachlorothiophenol.

The polyisocyanate typically includes toluene diisocyanate; 4,4'-diphenylmethane diisocyanate; polymeric 4,4'-diphenylmethane diisocyanate; carbodiimide-modified 4,4'-diphenylmethane diisocyanate; 3,3'-dimethyldiphenyl-4,4' diisocyanate; naphthalene diisocyanate; p-phenylene diisocyanate; xylene diisocyanate; p-tetramethylxylene diisocyanate; m-tetramethylxylene diisocyanate; ethylene diisocyanate; propylene-1,2-diisocyanate; tetramethylene-1,4-diisocyanate; cyclohexyl diisocyanate; 1,6-hexamethylene-diisocyanate; dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; isophorone diisocyanate; methyl cyclohexylene diisocyanate; triisocyanate of 1,6-hexamethylene-diisocyanate; triisocyanate of 2,2,4-trimethyl-1,6-hexane diisocyanate; triisocyanate of 2,4,4-trimethyl-1,6-hexane diisocyanate; 4,4'-dicyclohexylmethane diisocyanate; or trimethylhexamethylene diisocyanate.

Preferably, the monodisperse telechelic polyol has a polydispersity of from about 1.0 to about 1.1. In one construction, the cover has a thickness of less than about 0.05 inches and the core has a compression of between about 50 and about 90. Additionally, it is preferred that the core outer diameter be between about 1.50 inches and about 1.62 inches. The golf ball should have a coefficient of restitution of greater than about 0.8, more preferably, greater than about 0.81. In a preferred construction, the core includes a center and an outer core layer.

The present invention is also directed to a golf ball including a core; an intermediate layer; and a cover including a curing agent and a polyurethane prepolymer formed from a polyisocyanate and a monodisperse telechelic polyol having a polydispersity of between about 1.0 and about 1.3, and having the formula:

$$T\text{-}Z_n\text{-}C\text{-}Y\text{-}C\text{-}Z_n\text{-}T$$

where Y is at least one molecule or mixtures of molecules having at least two independently polymerized vinyl groups, such as 1,3-divinylbenzene or 1,4-divinylbenzene; C is a hydrogenated or unsaturated block derived by anionic polymerization of at least one monomer selected from the group consisting of conjugated dienes, alkenyl-substituted aromatics, and mixtures thereof; $Z_n$ is a branched or straight chain hydrocarbon connecting group which contains n=1–50 carbon atoms; and T is hydroxyl. Preferably, C comprises hydrogenated isoprene having a peak molecular weight of from about 500 to about 350,000.

The intermediate layer can be an inner cover layer, an outer core layer, or a water vapor barrier layer but, preferably, the intermediate layer is an inner cover layer, and the inner cover layer and the cover each have a thickness of less than about 0.05 inches. Ideally, the intermediate layer includes the monodisperse telechelic polyol or, alternatively, a monodisperse telechelic polyurethane. The intermediate layer may, alternatively, be formed from ionomers, vinyl resins; polyolefins; polyurethanes; polyureas; polyamides; polycarbonates; acrylic resins; thermoplastics; polyphenylene oxides; thermoplastic polyesters; thermoplastic rubbers; or highly-neutralized polymers. Preferably, the monodisperse telechelic polyol has a polydispersity of from about 1.0 to about 1.1.

The present invention is further directed to a golf ball consisting of a core; an intermediate layer; and a cover; wherein at least one of the intermediate layer or the cover includes a curing agent and a polyurethane prepolymer formed from a polyisocyanate and a monodisperse telechelic polyol having a polydispersity of between about 1.0 and about 1.3.

In a preferred embodiment, the intermediate layer is a water vapor barrier layer and having a thickness of from about 0.1 μm to about 75 μm. Ideally, the monodisperse telechelic polyol has a polydispersity of between about 1.0 and about 1.1. In one construction, the core has an outer diameter of no greater than about 1.62 inches.

In a preferred construction, the intermediate layer is an inner cover layer having a hardness of between about 40 and about 75 Shore D; and the cover is an outer cover layer having a hardness of between about 30 and about 60 Shore D. The inner cover layer typically has a flexural modulus of between about 30,000 and about 80,000 psi and the cover has a flexural modulus of between about 10,000 and about 30,000 psi.

DESCRIPTION OF THE PREFERRED EMBODIMENTS

Broadly, the present invention contemplates a golf ball comprising a polyurethane or polyurea elastomer formed from novel monodisperse telechelic polymers and hydrogenated and/or unprotected analogues thereof. The golf balls of the present invention may be formed from any one of a variety of constructions, including a solid, one-piece ball, but preferably include at least a core and a cover. Cores may be a single core layer or include a center and at least one outer core layer. The innermost portion of the core, while preferably solid, may alternatively be hollow or a liquid-, gel-, or air-filled sphere. The cover may be a single layer or include more than one layer, such as a cover formed of an outer cover layer and an inner cover layer. An intermediate or mantle layer may be disposed between the core and the cover of the golf ball. The intermediate layer, while typically a solid, contiguous layer, may also be non-contiguous layer, a vapor barrier layer, or comprise a tensioned elastomeric (or metal, "hoop stress" type layer) material (i.e., a wound layer).

The monodisperse telechelic polymers of the present invention have a polydispersity (a ratio of $M_w/M_n$) of about 1.0 to about 1.3, more preferably about 1.0 to about 1.2, and most preferably about 1.0 to about 1.1. As a result of its monodisperse nature, the telechelic polymers provide a more controlled molecular structure which, in turn, results in improved golf ball performance (i.e., impact strength and resiliency). The monodisperse telechelic polymers of the present invention are novel and significantly different than conventional telechelic polymers. For example, SARTOMER R Poly bd® R-20LM has a polydispersity of 2.0 and SARTOMER Poly bd® R-45 HTLO has a polydispersity of 2.5.

The monodisperse telechelic polyurethane elastomers suitable for use in the invention are a product of a reaction between at least one polyurethane prepolymer and at least one curing agent. The polyurethane prepolymer is a product formed by a reaction between at least one polyisocyanate and at least one monodisperse telechelic polyol, the monodisperse telechelic polyol being based on a hydrophobic backbone, such as hydrocarbon polyols, hydroxy-terminated polybutadiene polyols or their hydrogenated derivatives, polyethers, polycaprolactones and polyesters. As is well known in the art, a catalyst may be employed to promote the reaction between the curing agent and the isocyanate and telechelic polyol.

The monodisperse telechelic polyurea elastomers suitable for use in the invention are a product of a reaction between at least one polyurea prepolymer and at least one curing agent. The polyurea prepolymer is a product formed by a reaction between at least one polyisocyanate and at least one monodisperse telechelic polyamine, the monodisperse telechelic polyamine being based on a hydrophobic backbone, such as hydrocarbon polyamines, polybutadiene polyamines or their hydrogenated derivatives, polyethers, polycaprolactones and polyesters. As is well known in the art, a catalyst may be employed to promote the reaction between the curing agent and the isocyanate and monodisperse telechelic polyamine.

The functional monodisperse telechelic polydienes and polyolefins of the present invention are useful as novel polyurethane or polyurea prepolymers and/or cross-linkers. The nature of the functional groups on each terminus, and its protecting group, if present, can also be varied simply by changing the functionalized initiator or the functionalizing agent. Reactive functionalities include, hydroxyl, carboxyl, secondary amines, tertiary amines, and derivative functionalities for polyurethane, polyurea, epoxy, and free radical or radiation curing chemistries, preferably for polyurethane curing chemistry. Polymers with different functional groups on opposite chain ends allow selective curing chemistries. In addition to linear polymers, radial or star polymer architectures can be produced with functional groups on the star arms are possible.

The monodisperse telechelic functional polyols of the present invention can be defined as follows:

$$(Y)\text{-}[C\text{-}Z\text{-}T\text{-}(A\text{-}R^1R^2R^3)_m]_2$$

where Y represents a core derived by incorporation of at least one molecule or mixtures of molecules having at least two independently polymerized vinyl groups, such as 1,3-divinylbenzene or 1,4-divinylbenzene;

C is a hydrogenated or unsaturated block derived by anionic polymerization of at least one monomer selected from the group consisting of conjugated dienes, alkenyl-substituted aromatics, and mixtures thereof;

Z is a branched or straight chain hydrocarbon connecting group which contains 1–25 carbon atoms;

T is oxygen;

$(A-R^1R^2R^3)_m$ is a protecting group, in which A is an element selected from Group IVa of the Periodic Table of the Elements; and $R^1$, $R^2$ and $R^3$ are independently defined as hydrogen, $C_1$–$C_{25}$ alkyl, substituted $C_1$–$C_{25}$ alkyl groups containing lower $C_1$–$C_{10}$ alkyl, lower alkylthio, and lower dialkylamino groups, $C_3$–$C_{25}$ aryl or substituted $C_3$–$C_{25}$ aryl groups containing lower $C_1$–$C_{10}$ alkyl, lower alkylthio, lower dialkylamino groups, or $C_3$–$C_{12}$ cycloalkyl and substituted cycloalkyl groups containing 5 to 12 carbon atoms, and m is 1 when T is oxygen.

Preferably, the monodisperse telechelic functional polyols of the present invention can be defined as follows:

$$T-Z_n-C-Y-C-Z_n-T$$

where:

Y represents a core derived by incorporation of at least one molecule or mixtures of molecules having at least two independently polymerized vinyl groups, such as 1,3-divinylbenzene or 1,4-divinylbenzene;

C is a hydrogenated or unsaturated block derived by anionic polymerization of at least one monomer selected from the group consisting of conjugated dienes, alkenyl-substituted aromatics, and mixtures thereof;

Z is a branched or straight chain hydrocarbon connecting group which contains n=1–50 carbon atoms; and T is hydroxyl (OH).

Preferably C comprises hydrogenated isoprene having a peak molecular weight of from about 500 to about 350,000. Conjugated diene and alkenyl-substituted aromatic hydrocarbons to be anionically polymerized are chosen from the group of unsaturated organic compounds that can be polymerized anionically (i.e., in a reaction initiated by an organo-alkali metal). Examples of suitable conjugated diene hydrocarbons include, but are not limited to, 1,3-butadiene; isoprene; 2,3-dimethyl-1,3-butadiene; 1,3-pentadiene; myrcene; 2-methyl-3ethyl-1,3-butadiene; 2-methyl-3-ethyl-1,3-pentadiene; 1,3-hexadiene, 2-methyl-1,3-hexadiene; 1,3-heptadiene; 3-methyl-1,3-heptadienne; 1,3-octadiene; 3-butyl-1,3-octadiene; 3,4-dimethyl-1,3-hexadiene; 3-n-propyl-1,3-pentadienne; 4,5-diethyl-1,3-octadiene; 2,4-diethyl-1,3-butadiene; 2,3-di-n-propyl-1,3-butadienne; and 2-methyl-3-isopropyl-1,3-butadiene.

Preferably Y comprises polymerizable alkenyl-substituted aromatic hydrocarbons which include, but are not limited to, styrene, α-methylstyrene, vinyltoluene, 2-vinylpyridine, 4-vinylpyridine, 1-vinylnaphthalene, 2-vinylnaphthalene, 1-α-methylvinylnaphthalene, 2-α-methylvinylnaphthalene, 1,2-diphenyl-4-methyl-1-hexene, and mixtures thereof, as well as alkyl, cycloalkyl, aryl, alkylaryl and arylalkyl derivatives thereof in which the total number of carbon atoms in the combined hydrocarbon constituents is generally not greater than 18. Examples of these latter compounds include 3-methylstyrene, 3,5-diethylstyrene, 4-t-butylstyrene, 2-ethyl-4-benzylstyrene, 4-phenylstyrene, 4-p-tolylstyrene, 2,4-divinyltoluene and 4,5-dimethyl-1-vinylnaphthalene. U.S. Pat. No. 3,377,404, incorporated herein by reference in its entirety, discloses suitable additional alkenyl-substituted aromatic compounds. The polymers of the invention can be optionally hydrogenated.

Examples include, but are not limited to, polymeric diols (i.e., poLichelic™-DH25; poLichelic™-DH25H; and poLichelic™-DH50HS), such as those defined by chemical structures 1–3:

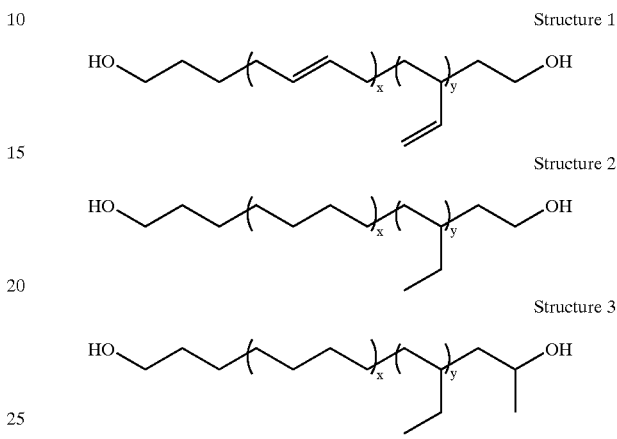

Structure 1

Structure 2

Structure 3

The monodisperse telechelic functional polyamines of the present invention can be defined as follows:

$$(Y)-[C-Z-T-(A-R^1R^2R^3)_m]_2$$

where Y represents a core derived by incorporation of at least one molecule or mixtures of molecules having at least two independently polymerized vinyl groups, such as 1,3-divinylbenzene or 1,4-divinylbenzene;

C is a hydrogenated or unsaturated block derived by anionic polymerization of at least one monomer selected from the group consisting of conjugated dienes, alkenyl-substituted aromatics, and mixtures thereof;

Z is a branched or straight chain hydrocarbon connecting group which contains 1–25 carbon atoms;

T is nitrogen;

$(A-R^1R^2R^3)_m$ is a protecting group, in which A is an element selected from Group IVa of the Periodic Table of the Elements; and $R^1$, $R^2$ and $R^3$ are independently defined as hydrogen, $C_1$–$C_{25}$ alkyl, substituted $C_1$–$C_{25}$ alkyl groups containing lower $C_1$–$C_{10}$ alkyl, lower alkylthio, and lower dialkylamino groups, $C_3$–$C_{25}$ aryl or substituted $C_3$–$C_{25}$ aryl groups containing lower $C_1$–$C_{10}$ alkyl, lower alkylthio, lower dialkylamino groups, or $C_3$–$C_{12}$ cycloalkyl and substituted cycloalkyl groups containing 5 to 12 carbon atoms, and m is 1 when T is oxygen or sulfur, and 2 when T is nitrogen.

Preferably, the monodisperse telechelic functional polyamines of the present invention can be defined as follows:

$$T-Z_n-C-Y-C-Z_n-T$$

where Y represents a core derived by incorporation of at least one molecule or mixtures of molecules having at least two independently polymerized vinyl groups, such as 1,3-divinylbenzene or 1,4-divinylbenzene;

C is a hydrogenated or unsaturated block derived by anionic polymerization of at least one monomer selected from the group consisting of conjugated dienes, alkenyl-substituted aromatics, and mixtures thereof;

Z is a branched or straight chain hydrocarbon connecting group which contains n=1–50 carbon atoms; and T is amine (primary; secondary; NHR).

Preferably C comprises hydrogenated isoprene having a peak molecular weight of from about 500 to about 350,000. Examples include, but are not limited to, polymeric di-2° amines (i.e., poLichelic™-DSA25H), such as those defined by the chemical structure 4:

Structure 4

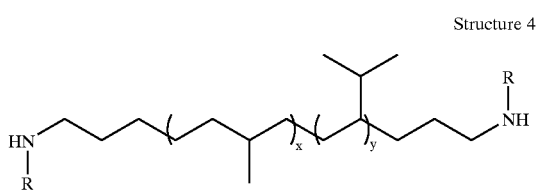

Additionally, other suitable compounds include, but are not limited to, α-hydroxyl-ω-aminepolyethylenebutylene with 50% butylene microstructure (i.e., poLichelic™ CSA-PEB-50); α-Hydroxyl-ω-aminepolybutadiene with 50% vinyl 1,2-microstructure (i.e., poLichelic™ DH-PBD-50); α,ω-Dihydroxypolyethylenebutylene with 25% butylene microstructure (i.e., poLichelic™ DH-PEB-25); α,ω-Diaminepolyethylenebutylene with 50% butylene microstructure (i.e., poLichelic™ DSA-PEB-50); α-Hydroxyl-ω-carboxylpolyethylenebutylene with 50% butylene microstructure (i.e., poLichelic™ HC-PEB-50); and α-Hydroxyl-ω-aminepolyethylenebutylene with 50% butylene microstructure (i.e., poLichelic™ HSA-PEB-50); all of which are commercially available under the poLichelic™ tradename from FMC Lithium of Gastonia, N.C.

Suitable diisocyanates which can be used include, without limitation, toluene diisocyanate; 4,4'-diphenylmethane diisocyanate; polymeric 4,4'-diphenylmethane diisocyanate; carbodiimide-modified 4,4'-diphenylmethane diisocyanate; 3,3'-dimethyldiphenyl-4,4' diisocyanate; naphthalene diisocyanate; p-phenylene diisocyanate; xylene diisocyanate; p-tetramethylxylene diisocyanate; m-tetramethylxylene diisocyanate; ethylene diisocyanate; propylene-1,2-diisocyanate; tetramethylene-1,4-diisocyanate; cyclohexyl diisocyanate; 1,6-hexamethylene-diisocyanate; dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane;
isophorone diisocyanate; methyl cyclohexylene diisocyanate; triisocyanate of 1,6-hexamethylene-diisocyanate; triisocyanate of 2,2,4-trimethyl-1,6-hexane diisocyanate; triisocyanate of 2,4,4-trimethyl-1,6-hexane diisocyanate; 4,4'-dicyclohexylmethane diisocyanate; trimethylhexamethylene diisocyanate, and mixtures thereof.

Suitable polyols which are appropriate for use in this invention include without limitation saturated and unsaturated hydrocarbon polyols; hydroxy-terminated liquid isoprene rubber; hydroxy-terminated polybutadiene polyol; polytetramethylene ether glycol ("PTMEG"); poly(oxypropylene) glycol; polyethylene adipate glycol; polyethylene propylene adipate glycol; polybutylene adipate glycol; diethylene glycol initiated polycaprolactone; 1,4-butanediol initiated polycaprolactone; 1,6-hexanediol initiated polycaprolactone; trimethylol propane initiated polycaprolactone; neopentyl glycol initiated polycaprolactone; PTMEG-initiated polycaprolactone and mixtures thereof.

Suitable curatives include without limitation 1,4-butanediol; 1,3-butanediol; 2,3-butanediol; 2,3-dimethyl-2,3-butanediol; propylene glycol, dipropylene glycol; polypropylene glycol; ethylene glycol; diethylene glycol; polyethylene glycol; resorcinol-di(β-hydroxyethyl) ether and its derivatives; hydroquinone-di(β-hydroxyethyl) ether and its derivatives; 2-propanol-1,1'-phenylaminobis; tetrahydroxypropylene ethylene diamine; trimethylolpropane; 4,4'-methylenebis(2-chloroaniline); 3,5-dimethylthio-2,4-toluenediamine; 3,5-dimethylthio-2,6-toluenediamine; 4,4'-methylenebis(2-ethylaniline); 4,4'-bis-(sec-butylamino)-diphenylmethane; 1,3-bis-(2-hydroxyethoxy)benzene; 1,3-bis-[2-(2-hydroxyethoxy)ethoxy]benzene; 1,3-bis-{2-[2-(2-hydroxyethoxy)ethoxy]ethoxy}benzene; 1,4-bis-(sec-butylamino)benzene; 1,2-bis-(sec-butylamino)benzene; 3,5-diethyltoluene-2,4-diamine; 3,5-diethyltoluene-2,6-diamine; tetra-(2-hydroxypropyl)-ethylenediamine; N,N'-dialkyldiamino diphenyl methane; trimethyleneglycol-di-p-aminobenzoate; polytetramethyleneoxide-di-p-aminobenzoate; 4,4'-methylene-bis-(3-chloro-2,6-diethylaniline); 1,4-cyclohexyldimethylol; 2-methylpentamethylene-diamine; isomers and mixtures of diaminocyclohexane; isomers and mixtures of cyclohexane bis(methylamine); polytetramethylene ether glycol; isomers and mixtures of cyclohexyldimethylol; triisopropanolamine; diethylene triamine; triethylene tetramine; tetraethylene pentamine; propylene diamine; 1,3-diaminopropane; dimethylamino propylamine; diethylamino propylamine; imidobis-propylamine; monoethanolamine; diethanolamine; triethanolamine; monoisopropanolamine and diisopropanolamine. The most preferred curatives are 3,5-dimethylthio-2,4-toluenediamine, 3,5-dimethylthio-2,6-toluenediamine and 4,4'-bis-(sec-butylamino)-diphenylmethane.

Suitable catalysts include, but are not limited to bismuth catalyst, oleic acid, triethylenediamine (DABCO®-33LV), di-butyltin dilaurate (DABCO®-T12) and acetic acid. The most preferred catalyst is triethylenediamine (DABCO®-33LV). DABCO® products are sold by Air Products.

Preferably, the polyurethane elastomers of the present invention comprise from about 1 to about 100%, more preferably from about 10 to about 75% of the cover composition and/or the intermediate layer composition. About 90 to about 10%, more preferably from about 90 to about 25% of the cover and/or the intermediate layer composition is comprised of one or more other polymers and/or other materials as described below. Such polymers include, but are not limited to polyurethane/polyurea ionomers, polyurethanes or polyureas and epoxy resins. Unless otherwise stated herein, all percentages are given in percent by weight of the total composition of the golf ball layer in question.

Other suitable materials which may be combined with the monodisperse telechelic polyurethane (or polyurea) elastomers in forming the cover and/or intermediate layer(s) of the golf balls of the invention include ionic or non-ionic polyurethanes or polyureas, siloxanes and epoxy resins or blends of these materials. For example, the cover and/or intermediate layer may be formed from a blend of at least one monodisperse telechelic polyurethane (or polyurea) elastomer with anionic and cationic urethanes/polyurethanes, urethane epoxies, polyureas and ionic polyureas and blends thereof. Examples of suitable urethane ionomers are disclosed in U.S. Pat. No. 5,692,974, the disclosure of which is hereby incorporated by reference in its entirety. Other examples of suitable polyurethanes are described in U.S. Pat. No. 5,334,673. Examples of appropriate polyureas are discussed in U.S. Pat. No. 5,484,870 and examples of suitable polyurethanes cured with epoxy group containing curing agents are disclosed in U.S. Pat. No. 5,908,358 which is incorporated herein, in its entirety, by reference thereto.

A variety of conventional components can be added to the cover compositions of the present invention. These include, but are not limited to, white pigment such as $TiO_2$, ZnO, optical brighteners, surfactants, processing aids, density-controlling fillers, UV stabilizers and light stabilizers and foaming agents. Addition of UV absorbers and light stabilizers to the water resistant polyurethane elastomers may help to maintain the tensile strength and elongation of the polyurethane elastomers. Suitable UV absorbers and light stabilizers include TINUVIN® 328, TINUIN® 213, TINUVIN® 765, TINUVIN® 770 and TINUVIN® 622. The preferred UV absorber is TINUVIN® 328, and the preferred light stabilizer is TINUVIN® 765. TINUVIN® products are available from Ciba-Geigy. Dyes, as well as optical brighteners and fluorescent pigments may also be included in the golf ball covers produced with polymers formed according to the present invention. Such additional ingredients may be added in any amounts that will achieve their desired purpose.

Other conventional ingredients, e.g., density-controlling fillers, ceramics and glass spheres are well known to the person of ordinary skill in the art and may be included in cover and intermediate layer blends of the present invention in amounts effective to achieve their known purpose.

An optional filler component may be chosen to impart additional density to blends of the previously described components. The selection of such filler(s) is dependent upon the type of golf ball desired (i.e., one-piece, two-piece multi-component or wound), as will be more fully detailed below. Generally, the filler will be inorganic, having a density greater than about 1.5 g/cc, preferably greater than 4 g/cc, and will be present in amounts between 5 and 65 weight percent based on the total weight of the polymer components comprising the layer(s) in question. Examples of useful fillers include nanoparticulates, zinc oxide, barium sulfate, calcium oxide, calcium carbonate and silica, as well as the other well known corresponding salts and oxides thereof.

To prevent or minimize the penetration of water vapor into the core of the golf ball, a thin water vapor barrier ("WVB") layer may be disposed anywhere between the core (or center) and the cover, preferably immediately around the core. The WVB layer should have a water vapor transmission ("WVT") rate that is lower than that of the cover materials, and preferably less than the WVT rate of an ionomer resin such as SURLYN®, which is about 0.80 g·mil/100 in$^2$·24 h at 38° C. and 90% relative humidity.

In accordance to one embodiment of the invention, the WVB layer is a thin polymeric layer that provides a conformal, pinhole-free film encapsulating the golf ball core. Conformal coatings can offer golf ball cores protection from water vapor absorption, prevent mechanical and thermal damages, resist abrasion, and enhance performance. the moisture vapor barrier layer is a thin and soft rubber layer. Butyl-based or natural rubbers are also suitable primary ingredients, due to their low moisture vapor transmission rates. A preferred metal acrylate is zinc diacrylate. Other suitable primary ingredients include, but are not limited to, trans-polyisoprene, neoprene, chlorinated polyethylene, balata, acrylics, multi-layer thermoplastic films, blends of ionomers, polyvinyl alcohol copolymer and polyamides, and dispersions of acid salts of polyetheramines, among others, etc. Additional suitable materials and methods for forming the WVB layer are disclosed in U.S. application Ser. No. 09/973,342, the disclosure of which is incorporated herein by reference. The WVB layer is preferably from about 0.1 $\mu$m to about 75 $\mu$m thick, more preferably from about 1 $\mu$m to about 25 $\mu$m thick, most preferably from about 3 $\mu$m to about 15 $\mu$m thick.

The materials for solid cores include compositions having a base rubber, a crosslinking agent, a filler, and a co-crosslinking or initiator agent, and preferably, a halogenated thiophenol compound. The base rubber typically includes natural or synthetic rubbers. A preferred base rubber is 1,4-polybutadiene having a cis-structure of at least 40%, more preferably at least about 90%, and most preferably at least about 95%. Most preferably, the base rubber comprises high-Mooney-viscosity rubber. Preferably, the base rubber has a Mooney viscosity greater than about 35, more preferably greater than about 50. Preferably, the polybutadiene rubber has a molecular weight greater than about 400,000 and a polydispersity of no greater than about 2.0. Examples of desirable polybutadiene rubbers include BUNA® CB22 and BUNA® CB23, commercially available from Bayer of Akron, Ohio; UBEPOL® 360L and UBEPOL® 150L, commercially available from UBE Industries of Tokyo, Japan; and CARIFLEX® BCP820, CARIFLEX® 1220, and CARIFLEX® BCP824, commercially available from Shell of Houston, Tex. If desired, the polybutadiene can also be mixed with other elastomers known in the art such as natural rubber, polyisoprene rubber and/or styrene-butadiene rubber in order to modify the properties of the core.

The crosslinking agent includes a metal salt, such as a zinc salt or a magnesium unsaturated fatty acid, such as acrylic or methacrylic acid, having 3 to 8 carbon atoms. Examples include, but are not limited to, one or more metal salt diacrylates, dimethacrylates, and monomethacrylates, wherein the metal is magnesium, calcium, zinc, aluminum, sodium, lithium, or nickel. Preferred acrylates include zinc acrylate, zinc diacrylate, zinc methacrylate, zinc dimethacrylate, and mixtures thereof. The crosslinking agent is typically present in an amount greater than about 10 parts per hundred ("pph") parts of the base polymer, preferably from about 20 to 40 pph of the base polymer, more preferably from about 25 to 35 pph of the base polymer. When a halogenated thiophenol compound is present, in a low cross-linking agent embodiment the agent is present in an amount of less than 25 pph. Alternatively, in a high cross-linking agent embodiment the agent is present in an amount of greater than 40 pph.

The initiator agent can be any known polymerization initiator which decomposes during the cure cycle. Suitable initiators include organic peroxide compounds, such as dicumyl peroxide; 1,1-di(t-butylperoxy) 3,3,5-trimethyl cyclohexane; $\alpha,\alpha$-bis (t-butylperoxy) diisopropylbenzene; 2,5-dimethyl-2,5 di(t-butylperoxy) hexane; di-t-butyl peroxide; and mixtures thereof. Other examples include, but are not limited to, VAROX® 231XL and Varox® DCP-R, commercially available from Elf Atochem of Philadelphia, Pa.; PERKODOX® BC and PERKODOX® 14, commercially available from Akzo Nobel of Chicago, Ill.; and ELASTOCHEM® DCP-70, commercially available from Rhein Chemie of Trenton, N.J.

It is well known that peroxides are available in a variety of forms having different activity. The activity is typically defined by the "active oxygen content." For example, PERKODOX® BC peroxide is 98% active and has an active oxygen content of 5.80%, whereas PERKODOX® DCP-70 is 70% active and has an active oxygen content of 4.18%. If the peroxide is present in pure form, it is preferably present in an amount of at least about 0.25 pph, more preferably between about 0.35 pph and about 2.5 pph, and most preferably between about 0.5 pph and about 2 pph. Peroxides are also available in concentrate form, which are well-known to have differing activities, as described above. In this case, if concentrate peroxides are employed in the present invention, one skilled in the art would know that the concentrations suitable for pure peroxides are easily adjusted for concentrate peroxides by dividing by the activity. For example, 2 pph of a pure peroxide is equivalent (at the same percent active oxygen content) to 4 pph of a concentrate peroxide that is 50% active (i.e., 2 divided by 0.5=4).

Halogenated thiophenol compounds are preferably included in the core. Suitable examples of these compounds include, but are not limited to, those having the following general formula:

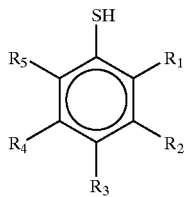

where $R_1$–$R_5$ can be $C_1$–$C_8$ alkyl groups; halogen groups; thiol groups (—SH), carboxylated groups; sulfonated groups; and hydrogen; in any order (at least on of which is preferably a halogen); and also pentafluorothiophenol; 2-fluorothiophenol; 3-fluorothiophenol; 4-fluorothiophenol; 2,3-fluorothiophenol; 2,4-fluorothiophenol; 3,4-fluorothiophenol; 3,5-fluorothiophenol 2,3,4-fluorothiophenol; 3,4,5-fluorothiophenol; 2,3,4,5-tetrafluorothiophenol; 2,3,5,6-tetrafluorothiophenol; 4-chlorotetrafluorothiophenol; pentachlorothiophenol; 2-chlorothiophenol; 3-chlorothiophenol; 4-chlorothiophenol; 2,3-chlorothiophenol; 2,4-chlorothiophenol; 3,4-chlorothiophenol; 3,5-chlorothiophenol; 2,3,4-chlorothiophenol; 3,4,5-chlorothiophenol; 2,3,4,5-tetrachlorothiophenol; 2,3,5,6-tetrachlorothiophenol; pentabromothiophenol; 2-bromothiophenol; 3-bromothiophenol; 4-bromothiophenol; 2,3-bromothiophenol; 2,4-bromothiophenol; 3,4-bromothiophenol; 3,5-bromothiophenol; 2,3,4-bromothiophenol; 3,4,5-bromothiophenol; 2,3,4,5-tetrabromothiophenol; 2,3,5,6-tetrabromothiophenol; pentaiodothiophenol; 2-iodothiophenol; 3-iodothiophenol; 4-iodothiophenol; 2,3-iodothiophenol; 2,4-iodothiophenol; 3,4-iodothiophenol; 3,5-iodothiophenol; 2,3,4-iodothiophenol; 3,4,5-iodothiophenol; 2,3,4,5-tetraiodothiophenol; 2,3,5,6-tetraiodothiophenoland; and their zinc salts.

Preferably, the halogenated thiophenol compound is pentachlorothiophenol, which is commercially available in neat form or under the tradename STRUKTOL® A95, a clay-based carrier containing the sulfur compound pentachlorothiophenol loaded at 45 percent (correlating to 2.4 parts PCTP). STRUKTOL® A95 is commercially available from Struktol Company of America of Stow, Ohio. PCTP is commercially available in neat form from eChinachem of San Francisco, Calif. and in the salt form from eChinachem of San Francisco, Calif. Most preferably, the halogenated thiophenol compound is the zinc salt of pentachlorothiophenol, which is commercially available from eChinachem of San Francisco, Calif. The halogenated thiophenol compounds (and their salts) of the present invention are present in an amount of from about 0.5 pph to about 6 pph, preferably between about 0.5 pph and about 1.5 pph. In a high halogenated thiophenol compound embodiment, the halogenated thiophenol is present in an amount greater than about 2 pph, more preferably between about 2.3 pph and about 5 pph, and most preferably between about 2.3 and about 4 pph.

Fillers typically include materials such as tungsten, zinc oxide, barium sulfate, silica, calcium carbonate, zinc carbonate, metals, metal oxides and salts, regrind (recycled core material typically ground to about 30 mesh particle), high-Mooney-viscosity rubber regrind, and the like. Fillers may be added to one or more portions of the golf ball and typically may include processing aids or compounds to affect rheological and mixing properties, density-modifying fillers, fillers to improve tear strength, or reinforcement fillers, and the like. The fillers are generally inorganic, and suitable fillers include numerous metals or metal oxides, such as zinc oxide and tin oxide, as well as barium sulfate, zinc sulfate, calcium carbonate, barium carbonate, clay, tungsten, tungsten carbide, an array of silicas, and mixtures thereof. Fillers may also include various foaming agents or blowing agents which may be readily selected by one of ordinary skill in the art. Fillers may include polymeric, ceramic, metal, and glass microspheres may be solid or hollow, and filled or unfilled. Fillers are typically also added to one or more portions of the golf ball to modify the density thereof to conform to uniform golf ball standards. Fillers may also be used to modify the weight of the center or at least one additional layer for specialty balls, e.g., a lower weight ball is preferred for a player having a low swing speed. The invention also includes, if desired, a method to convert the cis-isomer of the polybutadiene resilient polymer component to the trans-isomer during a molding cycle and to form a golf ball. A variety of methods and materials suitable for cis-to-trans conversion have been disclosed in U.S. Pat. Nos. 6,162,135; 6,465,578; 6,291,592; and 6,458,895, each of which are incorporated herein, in their entirety, by reference thereto.

The materials used in forming either the golf ball center or any portion of the core, in accordance with the invention, may be combined to form a mixture by any type of mixing known to one of ordinary skill in the art. Suitable types of mixing include single pass and multi-pass mixing. Suitable mixing equipment is well known to those of ordinary skill in the art, and such equipment may include a Banbury mixer, a two-roll mill, or a twin screw extruder.

Conventional mixing speeds for combining polymers are typically used. The mixing temperature depends upon the type of polymer components, and more importantly, on the type of free-radical initiator. Suitable mixing speeds and temperatures are well-known to those of ordinary skill in the art, or may be readily determined without undue experimentation. The mixture can be subjected to, e.g., a compression or injection molding process, to obtain solid spheres for the center or hemispherical shells for forming an intermediate layer. The temperature and duration of the molding cycle are selected based upon reactivity of the mixture. The molding cycle may have a single step of molding the mixture at a single temperature for a fixed time duration. The molding cycle may also include a two-step process, in which the polymer mixture is held in the mold at an initial temperature for an initial duration of time, followed by holding at a second, typically higher temperature for a second duration of time. In a preferred embodiment of the current invention, a single-step cure cycle is employed. The materials used in forming either the golf ball center or any portion of the core, in accordance with the invention, may be combined to form a golf ball by an injection molding process, which is also well-known to one of ordinary skill in the art. Although the curing time depends on the various materials selected, those of ordinary skill in the art will be readily able to adjust the curing time upward or downward based on the particular materials used and the discussion herein.

Any method known to one of ordinary skill in the art may be used to polyurethanes of the present invention. One commonly employed method, known in the art as a one-shot method, involves concurrent mixing of the polyisocyanate, polyol, and curing agent. This method results in a mixture that is inhomogenous (more random) and affords the manufacturer less control over the molecular structure of the resultant composition. A preferred method of mixing is known as a prepolymer method. In this method, the polyisocyanate and the polyol are mixed separately prior to addition of the curing agent. This method affords a more homogeneous mixture resulting in a more consistent polymer composition. Other methods suitable for forming the layers of the present invention include reaction injection molding ("RIM"), liquid injection molding ("LIM"), and pre-reacting the components to form an injection moldable thermoplastic polyurethane and then injection molding, all of which are known to one of ordinary skill in the art.

It has been found by the present invention that the use of a castable, reactive material, which is applied in a fluid form, makes it possible to obtain very thin outer cover layers on golf balls. Specifically, it has been found that castable, reactive liquids, which react to form a urethane elastomer material, provide desirable very thin outer cover layers.

The castable, reactive liquid employed to form the urethane elastomer material can be applied over the core using a variety of application techniques such as spraying, dipping, spin coating, or flow coating methods which are well known in the art. An example of a suitable coating technique is that which is disclosed in U.S. Pat. No. 5,733,428, the disclosure of which is hereby incorporated by reference in its entirety in the present application.

The outer cover is preferably formed around the inner cover by mixing and introducing the material in the mold halves. It is important that the viscosity be measured over time, so that the subsequent steps of filling each mold half, introducing the core into one half and closing the mold can be properly timed for accomplishing centering of the core cover halves fusion and achieving overall uniformity. Suitable viscosity range of the curing urethane mix for introducing cores into the mold halves is determined to be approximately between about 2,000 cP and about 30,000 cP, with the preferred range of about 8,000 cP to about 15,000 cP.

To start the cover formation, mixing of the prepolymer and curative is accomplished in motorized mixer including mixing head by feeding through lines metered amounts of curative and prepolymer. Top preheated mold halves are filled and placed in fixture units using centering pins moving into holes in each mold. At a later time, a bottom mold half or a series of bottom mold halves have similar mixture amounts introduced into the cavity. After the reacting materials have resided in top mold halves for about 40 to about 80 seconds, a core is lowered at a controlled speed into the gelling reacting mixture.

A ball cup holds the ball core through reduced pressure (or partial vacuum). Upon location of the coated core in the halves of the mold after gelling for about 40 to about 80 seconds, the vacuum is released allowing core to be released. The mold halves, with core and solidified cover half thereon, are removed from the centering fixture unit, inverted and mated with other mold halves which, at an appropriate time earlier, have had a selected quantity of reacting polyurethane prepolymer and curing agent introduced therein to commence gelling. Similarly, U.S. Pat. No. 5,006,297 and U.S. Pat. No. 5,334,673 both also disclose suitable molding techniques which may be utilized to apply the castable reactive liquids employed in the present invention. Further, U.S. Pat. Nos. 6,180,040 and 6,180,722 disclose methods of preparing dual core golf balls. The disclosures of these patents are hereby incorporated by reference in their entirety. However, the method of the invention is not limited to the use of these techniques.

The golf ball layers of the present invention can likewise include one or more homopolymeric or copolymeric materials, such as:

(1) Vinyl resins, such as those formed by the polymerization of vinyl chloride, or by the copolymerization of vinyl chloride with vinyl acetate, acrylic esters or vinylidene chloride;

(2) Polyolefins, such as polyethylene, polypropylene, polybutylene and copolymers such as ethylene methylacrylate, ethylene ethylacrylate, ethylene vinyl acetate, ethylene methacrylic or ethylene acrylic acid or propylene acrylic acid and copolymers and homopolymers produced using a single-site catalyst or a metallocene catalyst;

(3) Polyurethanes, such as those prepared from polyols and diisocyanates or polyisocyanates and those disclosed in U.S. Pat. No. 5,334,673;

(4) Polyureas, such as those disclosed in U.S. Pat. No. 5,484,870;

(5) Polyamides, such as poly(hexamethylene adipamide) and others prepared from diamines and dibasic acids, as well as those from amino acids such as poly(caprolactam), and blends of polyamides with SURLYN®, polyethylene, ethylene copolymers, ethyl-propylene-non-conjugated diene terpolymer, and the like;

(6) Acrylic resins and blends of these resins with poly vinyl chloride, elastomers, and the like;

(7) Thermoplastics, such as urethanes; olefinic thermoplastic rubbers, such as blends of polyolefins with ethylene-propylene-non-conjugated diene terpolymer; block copolymers of styrene and butadiene, isoprene or ethylene-butylene rubber; or copoly(ether-amide), such as PEBAX®, sold by ELF Atochem of Philadelphia, Pa.;

(8) Polyphenylene oxide resins or blends of polyphenylene oxide with high impact polystyrene as sold under the trademark NORYL® by General Electric Company of Pittsfield, Mass.;

(9) Thermoplastic polyesters, such as polyethylene terephthalate, polybutylene terephthalate, polyethylene terephthalate/glycol modified and elastomers sold under the trademarks HYTREL® by E.I. DuPont de Nemours & Co. of Wilmington, Del., and LOMOD® by General Electric Company of Pittsfield, Mass.;

(10) Blends and alloys, including polycarbonate with acrylonitrile butadiene styrene, polybutylene terephthalate, polyethylene terephthalate, styrene maleic anhydride, polyethylene, elastomers, and the like, and polyvinyl chloride with acrylonitrile butadiene styrene or ethylene vinyl acetate or other elastomers; and

(11) Blends of thermoplastic rubbers with polyethylene, propylene, polyacetal, nylon, polyesters, cellulose esters, and the like.

Any of the cover layers can include polymers, such as ethylene, propylene, butene-1 or hexane-1 based homopolymers or copolymers including functional monomers, such as acrylic and methacrylic acid and fully or partially neutralized ionomer resins and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly(phenylene sulfide), acrylonitrile-butadiene, acrylic-styrene-acrylonitrile, poly(ethylene terephthalate), poly(butylene terephthalate), poly(ethelyne vinyl alcohol), poly(tetrafluoroethylene) and their copolymers including functional co-monomers, and blends thereof. Suitable cover compositions also include a polyether or polyester thermoplastic urethane, a thermoset polyurethane, a low modulus ionomer, such as acid-containing ethylene copolymer ionomers, including E/X/Y terpolymers where E is ethylene, X is an acrylate or methacrylate-based softening comonomer present in about 0 to 50 weight percent and Y is acrylic or methacrylic acid present in about 5 to 35 weight percent. Preferably, the acrylic or methacrylic acid is present in about 8 to 35 weight percent, more preferably 8 to 25 weight percent, and most preferably 8 to 20 weight percent.

Any of the inner or outer cover layers and/or cores, centers, and core layers, may also be formed from polymers containing α,β-unsaturated carboxylic acid groups, or the salts thereof, that have been 100 percent neutralized by organic fatty acids. The acid moieties of the highly-neutralized polymers ("HNP"), typically ethylene-based ionomers, are preferably neutralized greater than about 70%, more preferably greater than about 90%, and most preferably at least about 100%. The HNP's can be also be blended with a second polymer component, which, if containing an acid group, may be neutralized in a conventional manner, by the organic fatty acids of the present invention, or both. The second polymer component, which may be partially or fully neutralized, preferably comprises ionomeric copolymers and terpolymers, ionomer precursors, thermoplastics, polyamides, polycarbonates, polyesters, polyurethanes, polyureas, thermoplastic elastomers, polybutadiene rubber, balata, metallocene-catalyzed polymers (grafted and nongrafted), single-site polymers, high-crystalline acid polymers, cationic ionomers, and the like.

The acid copolymers can be described as E/X/Y copolymers where E is ethylene, X is an α,β-ethylenically unsaturated carboxylic acid, and Y is a softening comonomer. In a preferred embodiment, X is acrylic or methacrylic acid and Y is a $C_{1-8}$ alkyl acrylate or methacrylate ester. X is preferably present in an amount from about 1 to about 35 weight percent of the polymer, more preferably from about 5 to about 30 weight percent of the polymer, and most preferably from about 10 to about 20 weight percent of the polymer. Y is preferably present in an amount from about 0 to about 50 weight percent of the polymer, more preferably from about 5 to about 25 weight percent of the polymer, and most preferably from about 10 to about 20 weight percent of the polymer.

The organic acids are aliphatic, mono-functional (saturated, unsaturated, or multi-unsaturated) organic acids. Salts of these organic acids may also be employed. The salts of organic acids of the present invention include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, behenic, erucic, oleic, linoelic or dimerized derivatives thereof. It is preferred that the organic acids and salts of the present invention be relatively non-migratory (they do not bloom to the surface of the polymer under ambient temperatures) and non-volatile (they do not volatilize at temperatures required for melt-blending).

Thermoplastic polymer components, such as copolyetheresters, copolyesteresters, copolyetheramides, elastomeric polyolefins, styrene diene block copolymers and their hydrogenated derivatives, copolyesteramides, thermoplastic polyurethanes, such as copolyetherurethanes, copolyesterurethanes, copolyureaurethanes, epoxy-based polyurethanes, polycaprolactone-based polyurethanes, polyureas, and polycarbonate-based polyurethanes fillers, and other ingredients, if included, can be blended in either before, during, or after the acid moieties are neutralized, thermoplastic polyurethanes.

A variety of conventional components can be added to the cover compositions of the present invention. These include, but are not limited to, white pigment such as $TiO_2$, ZnO, optical brighteners, surfactants, processing aids, foaming agents, density-controlling fillers, UV stabilizers and light stabilizers. Saturated polyurethanes are resistant to discoloration. However, they are not immune to deterioration in their mechanical properties upon weathering. Addition of UV absorbers and light stabilizers to any of the above compositions and, in particular, the polyurethane compositions, help to maintain the tensile strength, elongation, and color stability. Suitable UV absorbers and light stabilizers include TINUVIN® 328, TINUVIN® 213, TINUVIN® 765, TINUVIN® 770 and TINUVIN® 622. The preferred UV absorber is TINUVIN® 328, and the preferred light stabilizer is TINUVIN® 765. TINUVIN® products are available from Ciba-Geigy. Dyes, as well as optical brighteners and fluorescent pigments may also be included in the golf ball covers produced with polymers formed according to the present invention. Such additional ingredients may be added in any amounts that will achieve their desired purpose.

The resultant golf balls typically have a coefficient of restitution of greater than about 0.75, preferably greater than about 0.8, and more preferably greater than about 0.81. In a non-USGA-conforming embodiment, the golf ball has a COR of greater than about 0.820, preferably greater than about 0.830, more preferably greater than about 0.835, and most preferably greater than about 0.840. The golf balls of the present invention also typically have an Atti compression of less than about 120, preferably from about 30 to 90, and more preferably from about 60 to 80.

When golf balls are prepared according to the invention, they typically will have dimple coverage greater than about 60 percent, preferably greater than about 65 percent, and more preferably greater than about 75 percent. The flexural modulus of the cover on the golf balls, as measured by ASTM method D6272-98, Procedure B, is typically greater than about 500 psi, and is preferably from about 500 psi to 150,000 psi.

As discussed herein, the outer cover layer is preferably formed from the polyurethane, polyurea, or hybrid materials of the invention. In particular, the material of the outer cover layer should have a material hardness, as measured by ASTM-D2240, less than about 65 Shore D, preferably less than about 50 Shore D, more preferably between about 25 and about 40 Shore D, and most preferably between about 30 and about 40 Shore D. The intermediate layer, if present, preferably has a material hardness of less than about 80 Shore D, more preferably between about 30 and about 70 Shore D, and most preferably, between about 50 and about 65 Shore D. In a more preferred embodiment, a ratio of the intermediate layer material hardness to the outer cover layer material hardness is greater than 1.5.

The cover layer(s) and intermediate layer(s), if present, of the invention each preferably have a thickness of less than about 0.1 inches, more preferably less than about 0.05 inches, and most preferably between about 0.02 inches and about 0.04 inches. In a preferred embodiment, the outer cover is formed from the monodisperse telechelic polyurethanes of the present invention and has a thickness of from about 0.02 inches to about 0.04 inches; and an intermediate layer is present, as an inner cover layer, and has a thickness of from about 0.03 inches to about 0.04 inches. The intermediate layer in this embodiment may be formed from any of the above-listed preferred layer materials, including a blend.

It should be understood, especially to one of ordinary skill in the art, that there is a fundamental difference between "material hardness" and "hardness, as measured directly on a golf ball." Material hardness is defined by the procedure set forth in ASTM-D2240 and generally involves measuring the hardness of a flat "slab" or "button" formed of the material of which the hardness is to be measured. Hardness, when measured directly on a golf ball (or other spherical surface) is a completely different measurement and, therefore, results in a different hardness value. This difference results from a number of factors including, but not limited to, ball construction (i.e., core type, number of core and/or cover layers, etc.), ball (or sphere) diameter, and the material composition of adjacent layers. It should also be understood that the two measurement techniques are not linearly related and, therefore, one hardness value cannot easily be correlated to the other.

In one embodiment, the core (including any optional outer core layers, if present) of the present invention has an Atti compression of between about 50 and about 90, more preferably, between about 60 and about 85, and most preferably, between about 70 and about 85. The overall outer diameter ("OD") of the core is no greater than about 1.62 inches, preferably, no greater than 1.60 inches, more preferably between about 1.50 inches and about 1.59 inches, and most preferably between about 1.55 inches to about 1.58 inches. The OD of the intermediate layer, if present, of the golf balls of the present invention is preferably between 1.58 inches and about 1.65 inches, more preferably between about 1.59 inches to about 1.63 inches, and most preferably between about 1.60 inches to about 1.63 inches.

The present golf ball can have an overall diameter of any size, although one preferred diameter of the invention is 1.68 inches because this is the USGA limit for minimum golf ball diameter. There is no specification as to the maximum diameter. Golf balls of any size, however, can be used for recreational play. The preferred diameter of the present golf balls is from about 1.60 inches to about 1.800 inches. The more preferred diameter is from about 1.62 inches to about 1.740 inches. The most preferred diameter is about 1.660 inches to about 1.690 inches.

The golf balls of the present invention should have a moment of inertia ("MOI") of less than about 85 and, preferably, less than about 83. The MOI is typically measured on model number MOI-005-104 Moment of Inertia Instrument manufactured by Inertia Dynamics of Collinsville, Conn. The instrument is plugged into a PC for communication via a COMM port and is driven by MOI Instrument Software version #1.2.

The polymers of the present invention may also be used in golf equipment, in particular, inserts or coatings for golf clubs (and club faces), such as putters, irons, and woods, as well as in golf shoes and components thereof. For example, such inserts can be in the face of a golf club as disclosed in U.S. Pat. No. 5,575,472, which is incorporated in its entirety by reference herein, or in the back cavity as disclosed in U.S. Pat. No. 5,316,298, which is also incorporated in its entirety by reference herein.

As used herein, the term "about," used in connection with one or more numbers or numerical ranges, should be understood to refer to all such numbers, including all numbers in a range.

The invention described and claimed herein is not to be limited in scope by the specific embodiments herein disclosed, since these embodiments are intended solely as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A golf ball comprising:

a core; and a cover layer comprising a curing agent and a polyurethane prepolymer formed from a polyisocyanate and a monodisperse telechelic polyol having a polydispersity of from about 1.0 to about 1.3, and having the formula:

$$T\text{-}Z_n\text{-}C\text{-}Y\text{-}C\text{-}Z_n\text{-}T$$

where Y is at least one molecule or mixtures of molecules having at least two independently polymerized vinyl groups;

C is a hydrogenated or unsaturated block derived by anionic polymerization of at least one monomer selected from the group consisting of conjugated dienes, alkenyl-substituted aromatics, and mixtures thereof;

$Z_n$ is a branched or straight chain hydrocarbon connecting group which contains n=1–50 carbon atoms; and T is hydroxyl.

2. The golf ball of claim 1, wherein the core comprises a polybutadiene composition and the salt of a halogenated thiophenol.

3. The golf ball of claim 2, wherein the salt of a halogenated thiophenol comprises the zinc salt of pentachlorothiophenol.

4. The golf ball of claim 1, wherein the polyisocyanate comprises toluene diisocyanate; 4,4'-diphenylmethane diisocyanate; polymeric 4,4'-diphenylmethane diisocyanate; carbodiimide-modified 4,4'-diphenylmethane diisocyanate; 3,3'-dimethyldiphenyl-4,4' diisocyanate; naphthalene diisocyanate; p-phenylene diisocyanate; xylene diisocyanate; p-tetramethylxylene diisocyanate; m-tetramethylxylene diisocyanate; ethylene diisocyanate; propylene-1,2-diisocyanate; tetramethylene-1,4-diisocyanate; cyclohexyl diisocyanate; 1,6-hexamethylene-diisocyanate; dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane;

isophorone diisocyanate; methyl cyclohexylene diisocyanate; triisocyanate of 1,6-hexamethylene-diisocyanate; triisocyanate of 2,2,4-trimethyl-1,6-hexane diisocyanate; triisocyanate of 2,4,4-trimethyl-1,6-hexane diisocyanate; 4,4'-dicyclohexylmethane diisocyanate; or trimethylhexamethylene diisocyanate.

5. The golf ball of claim 1, wherein the monodisperse telechelic polyol has a polydispersity of from about 1.0 to about 1.1.

6. The golf ball of claim 1, wherein the cover has a thickness of less than about 0.05 inches and the core has a compression of between about 50 and about 90.

7. The golf ball of claim 1, wherein the core outer diameter is between about 1.50 inches and about 1.62 inches.

8. The golf ball of claim 1, wherein the golf ball has a coefficient of restitution of greater than about 0.8.

9. The golf ball of claim 1, wherein the golf ball has a coefficient of restitution of greater than about 0.81.

10. The golf ball of claim 1, wherein C comprises hydrogenated isoprene having a peak molecular weight of from about 500 to about 350,000.

11. The golf ball of claim 1, wherein the core comprises a center and an outer core layer.

12. A golf ball comprising:
a core;
an intermediate layer; and
a cover comprising a curing agent and a polyurethane prepolymer formed from a polyisocyanate and a monodisperse telechelic polyol having a polydispersity of between about 1.0 and about 1.3, and having the formula:

$$T\text{-}Z_n\text{-}C\text{-}Y\text{-}C\text{-}Z_n\text{-}T$$

where Y is at least one molecule or mixtures of molecules having at least two independently polymerized vinyl groups;
C is a hydrogenated or unsaturated block derived by anionic polymerization of at least one monomer selected from the group consisting of conjugated dienes, alkenyl-substituted aromatics, and mixtures thereof;
$Z_n$ is a branched or straight chain hydrocarbon connecting group which contains n=1–50 carbon atoms; and
T is hydroxyl.

13. The golf ball of claim 12, wherein the intermediate layer is an inner cover layer, an outer core layer, or a water vapor barrier layer.

14. The golf ball of claim 12, wherein the intermediate layer is an inner cover layer, and the inner cover layer and the cover each have a thickness of less than about 0.05 inches.

15. The golf ball of claim 12, wherein the intermediate layer comprises the monodisperse telechelic polyol or a monodisperse telechelic polyurea.

16. The golf ball of claim 12, wherein the intermediate layer comprises ionomers, vinyl resins; polyolefins; polyurethanes; polyureas; polyamides; polycarbonates; acrylic resins; thermoplastics; polyphenylene oxides; thermoplastic polyesters; thermoplastic rubbers; or highly-neutralized polymers.

17. The golf ball of claim 12, wherein C comprises hydrogenated isoprene having a peak molecular weight of from about 500 to about 350,000.

18. The golf ball of claim 12, wherein the monodisperse telechelic polyol has a polydispersity of from about 1.0 to about 1.1.

19. A golf ball comprising:
a core;
an intermediate layer; and
a cover;
wherein at least one of the intermediate layer or the cover comprises a curing agent and a polyurethane prepolymer formed from a polyisocyanate and a monodisperse telechelic polyol having a polydispersity of between about 1.0 and about 1.3 and having the formula:

$$T\text{-}Z_n\text{-}C\text{-}Y\text{-}C\text{-}Z_n\text{-}T$$

where Y is at least one molecule or mixtures of molecules having at least two independently polymerized vinyl groups:
C is a hydrogenated or unsaturated block derived by anionic polymerization of at least one monomer selected from the group consisting of conjugated dienes, alkenyl-substituted aromatics, and mixtures thereof;
$Z_n$ is a branched or straight chain hydrocarbon connecting group which contains n =1–50 carbon atoms: and
T is hydroxyl.

20. The golf ball of claim 19, wherein the intermediate layer is a water vapor barrier layer and having a thickness of from about 0.1 μm to about 75 μm.

21. The golf ball of claim 19, wherein the monodisperse telechelic polyol has a polydispersity of between about 1.0 and about 1.1.

22. The golf ball of claim 19, wherein the core has an outer diameter of no greater than about 1.62 inches.

23. The golf ball of claim 19, wherein the intermediate layer is an inner cover layer having a hardness of between about 40 and about 75 Shore D; and the cover is an outer cover layer having a hardness of between about 30 and about 60 Shore D.

24. The golf ball of claim 23, wherein the inner cover layer has a flexural modulus of between about 30,000 and about 80,000 psi and the cover has a flexural modulus of between about 10,000 and about 30,000 psi.

* * * * *